United States Patent [19]

Geiser

[11] Patent Number: 4,634,094

[45] Date of Patent: Jan. 6, 1987

[54] SHUTOFF VALVE

[75] Inventor: Friedrich Geiser, Nüziders, Austria

[73] Assignee: Siegfried Schertler, Haag, Switzerland

[21] Appl. No.: 835,546

[22] Filed: Mar. 3, 1986

[30] Foreign Application Priority Data

Mar. 8, 1985 [DE] Fed. Rep. of Germany ....... 3508318

[51] Int. Cl.⁴ .................... F16K 31/124; F16K 31/163
[52] U.S. Cl. ...................................... 251/58; 251/229; 251/252; 251/305; 251/308; 74/57; 74/25; 74/89
[58] Field of Search ................. 251/58, 229, 252, 304, 251/305, 306, 307, 308; 74/57, 25, 89

[56] References Cited

U.S. PATENT DOCUMENTS

| | | | |
|---|---|---|---|
| 2,315,775 | 4/1943 | D'Arcey | 251/58 |
| 2,883,144 | 4/1959 | Kendig | 251/58 |
| 3,184,214 | 5/1965 | King | 251/252 |
| 3,385,562 | 5/1968 | Newell | 251/308 |
| 3,601,360 | 8/1971 | Scaramucci | 251/304 |
| 4,241,897 | 12/1980 | Maezawa | 251/252 |
| 4,504,038 | 3/1985 | King | 251/58 |
| 4,519,578 | 5/1985 | Boeckman et al. | 251/308 |
| 4,586,693 | 5/1986 | Tinner | 251/58 |

FOREIGN PATENT DOCUMENTS 2748201  5/1978  Fed. Rep. of Germany .

Primary Examiner—George L. Walton
Attorney, Agent, or Firm—Toren, McGeady & Goldberg

[57] ABSTRACT

A shutoff valve includes a pivotably displaceable flap shaped cutoff part mounted in a flow passageway through a housing. The flap shaped cutoff part is relatively thin so that in the fully open position it does not appreciable reduce the flow passageway cross-section. The cutoff part is pivotably supported at one point in the housing wall and at a diagonally opposite it is supported by a combination of a guide pin and a sliding guide. An actuator located outside the flow passageway is connected to the cutoff part for displacing it between the closed and opened positions. The actuator includes a piston cylinder unit connected to a shifter rod. The shifter rod effects the movement of the guide pin in the sliding guide so that the cutoff part is pivoted about an axis extending transversely of the axis of the flow passageway between the closed and opened positions. By the rectilinear axial movement of the shifter rod the pivotable movement of the cutoff part takes place and the cutoff part is pressed into the closed position into sealed engagement with a valve seat in the housing.

6 Claims, 8 Drawing Figures

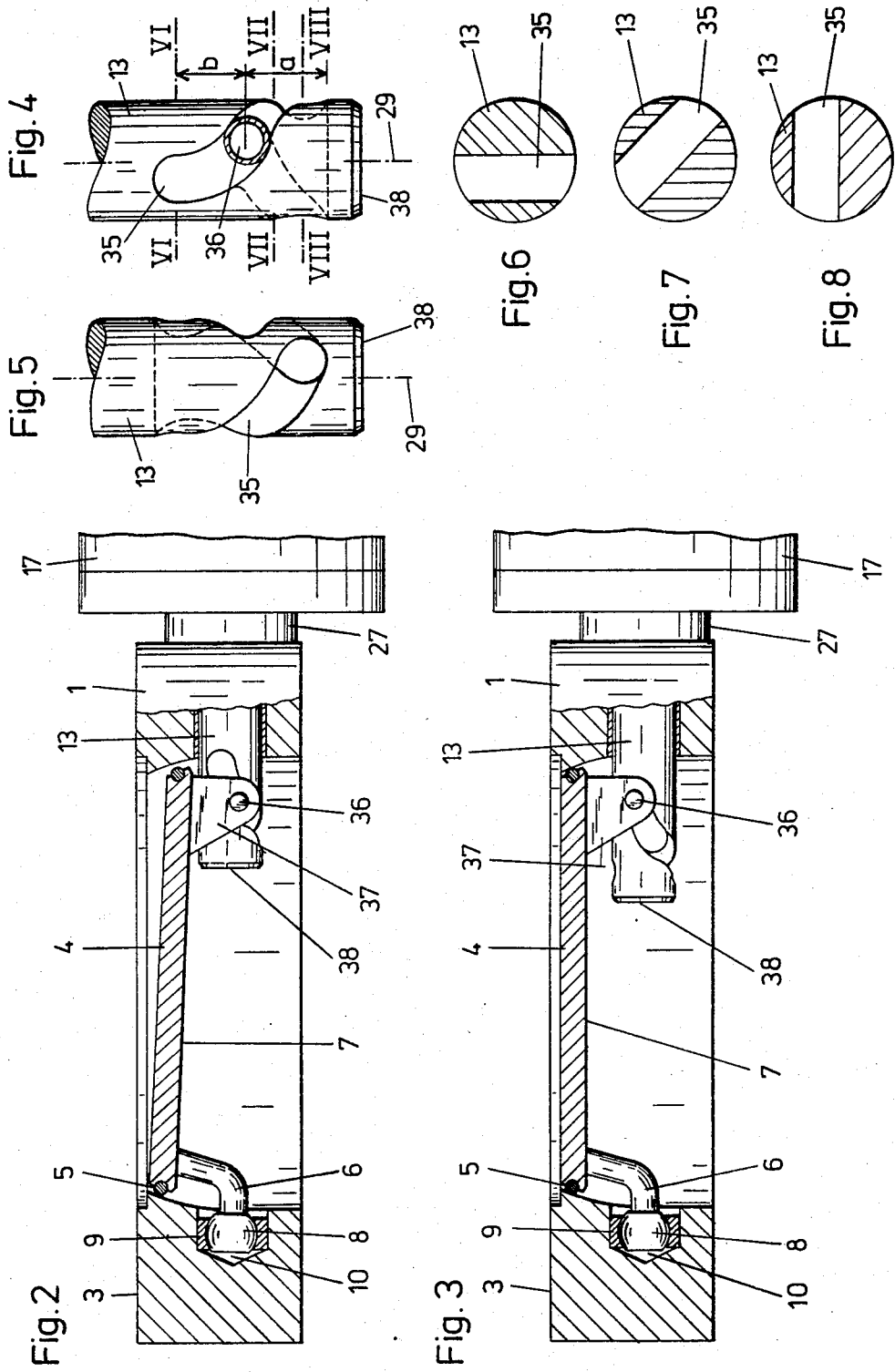

SHUTOFF VALVE

BACKGROUND OF THE INVENTION

The present invention is directed to a shutoff valve for pipelines or containers and includes a housing with a flap shaped cutoff part pivotably supported within the passageway formed by the housing. The cutoff part can be pivoted between a closed position in sealed contact with a valve seat in the housing to an open position by means of an actuator including a shifter rod aligned with the pivot axis of the cutoff member. A support shaft is attached to the cutoff part on one side and projects beyond the circumference of the cutoff part and has a ball member at its outer end supported in a universally pivotable manner within the housing wall. On the diametrically opposite side of the cutoff part from the shaft the cutoff part is secured to the axial displaceable shifter rod by the combination of a guide pin and a sliding guide. The sliding guide is arranged to extend obliquely to the axis of the shifter rod. The relative movement of the guide pin and the sliding guide effects the pivotable movement of the cutoff part so that it can be moved between the closed and opened positions relative to the flow passageway in the housing.

Shutoff valves of this type are known, such as disclosed in the German patent publication No. 27 48 201. Such valves are used as throttle valves, where it is important that the throttling positions can be accurately repeated, that is, the throttle positions have an accurately reproducible opening regardless of whether the throttle valve is moved into a given position from the closed or the opened position of the valve. This desired feature of the throttle valve is obtained with a higher degree of accuracy if the amount of play or tolerance between the moveable parts is maintained as low as possible. A significant feature in the design of such a throttle valve is that the valve movements must be easily reproducible with as few bearing and support parts as possible.

Easily reproducible movements are possible if the parts movable with respect to one another can be sealed reliably at a relatively small production cost.

If the previously known throttle valve is considered with the two embodiments disclosed in German patent document No. 27 48 201 in view of these requirements, then it must be noted that these requirements have not been adequately meet in either of the embodiments. The shutoff or cutoff part is pivotably and tiltably moveable, however, the movements of the cutoff part are achieved by a number of subdivided components and sliding guides. For each movement interruption and each guide condition, a corresponding bearing play is present and the sum of all these bearing clearances provide a situation which should be avoided, that is, wherein at least two different positions of the cutoff part correspond to one specific position of the actuating elements, which are operated externally, depending upon the direction from which the position is approached.

SUMMARY OF THE INVENTION

Therefore, the primary object of the present invention is to avoid the above disadvantages by providing an actuator including a shifter rod which is displaceable only in the axially direction with a sliding guide associated with the shifter rod for effecting the pivotable movement of the cutoff part. The sliding guide is shaped relative to the shifter rod axis so that the cutoff part can be pivoted through an angle of 90°. Since one sliding guide can effect the pivotable movement and a further tilting displacement of the cutoff part, the bearing play in the valve can be kept quite low. Further, a simple sealing arrangement for the valve and the actuator is possible using the metal bellows within the actuator for affording a secure seal and also assuring that the shifter rod is free of any friction and play. The metal bellows which can be utilized as a sealing element, assures a tight seal during the whole movement of the cutoff part and for cleaning purposes these metal bellows can be heated, they can be installed in regions of radioactivity and can prevent any gas flow inwardly or outwardly under high vacuum conditions. Moreover, the seal is free of any lubricants and this is very important in valves utilized under high vacuum conditions. The almost play-free support affords perfectly reproducible positions of the valve and such positions can be determined by position indicators. With such an arrangement it is also possible to prevent the cutoff part from fluttering where high gas flows and differential pressures are present. In addition, this type of support affords a long useful life of the various valve parts because with the practically play-free support very little if any wear occurs. Due to the present invention the movement of the shifter rod is practically transferrable to the cutoff part free of any clearance space, so that a nearly ideal valve characteristic can be achieved. For the actuation of the cutoff part a single spiral groove or slot in combination with a pin extending through the groove or slot affords the desired pivotable movement of the cutoff part. As a result, a small clearance can be maintained between the shifter rod and the cutoff part so that the transmission of movement to the cutoff part is clearance-free and is also free of any point type pressure. Moreover, the present invention affords a compact and easily serviceable valve arrangement.

In one embodiment of the invention, a slot-like sliding guide can be provided at the end of the shifter rod extending into the housing with a guide pin secured to the cutoff part and slidably mounted within the sliding guide. It is also possible, however, to locate the sliding guide on the cutoff part with the pin located on the shifter rod thus affording a reversal in the arrangement of the parts affording the movement of the cutoff part.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIGS. 2 and 3 are partial views of the shutoff valve shown in FIG. 1 rotated through 90°, however, with the cutoff part pivoted in FIG. 2 toward the closed position and in the closed position in FIG. 3;

FIGS. 4 and 5 are side views of the end of the shifter rod extending into the valve with each view being offset by 90° relative to the other and shown on an enlarged scale; and FIGS. 6, 7 and 8 are cross-sectional views taken along the lines VI—VI, VII—VII and VIII—VIII in FIG. 4.

DETAILED DESCRIPTION OF THE INVENTION

Figure 1:
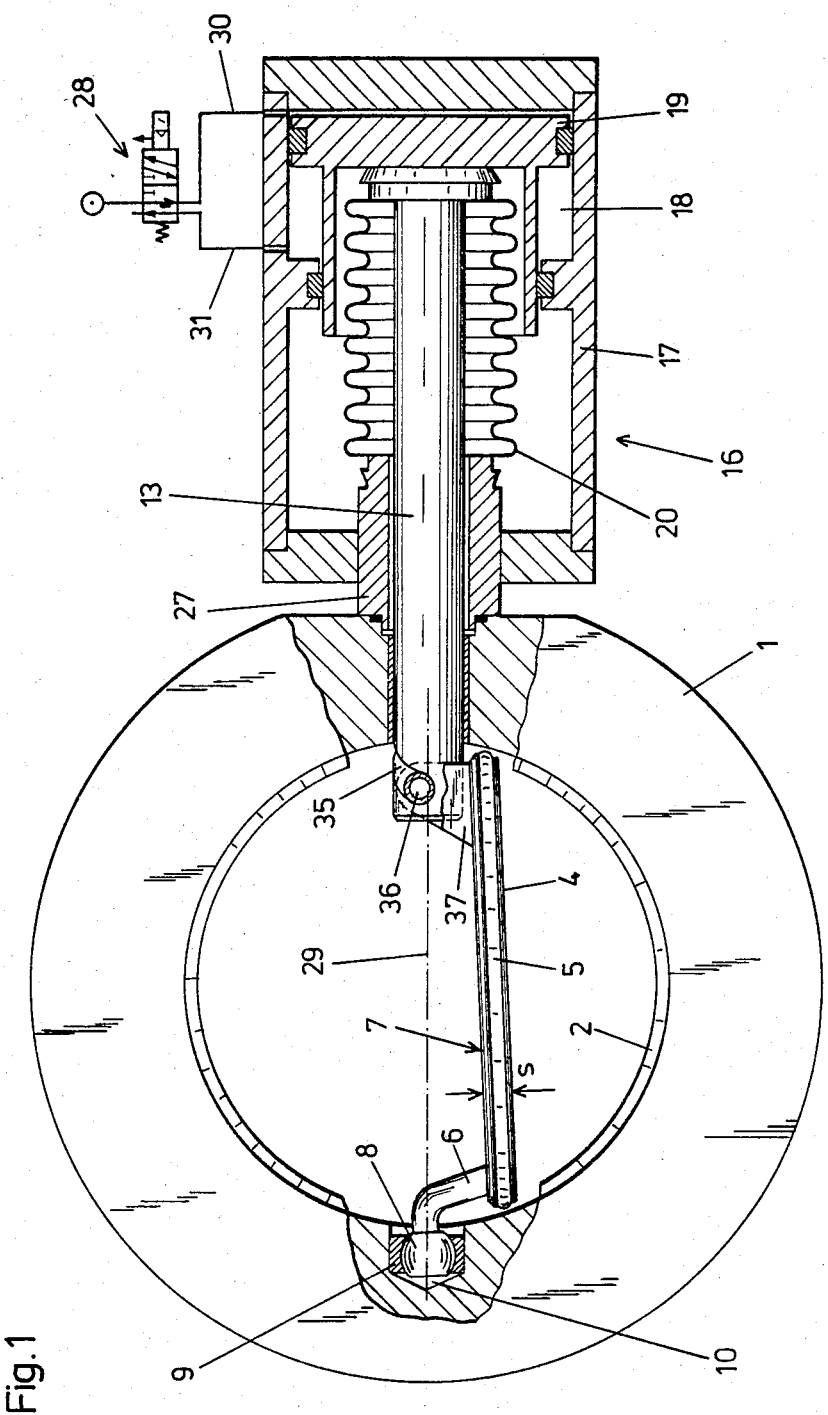
FIG. 1 is a view, partially in section, of a shutoff valve embodying the present invention with the cutoff part displayed in the open position.

A shutoff valve is shown in FIGS. 1-3 and includes an annular housing 1 defining a flow passageway 2 which tapers inwardly in a conical or spherical manner toward the upper flange side 3 of the housing as viewed in FIGS. 2 and 3. Within the flow passageway 2 through the housing a thin circular flap-shaped disc or cutoff part 4 is pivotally supported. As seen in FIGS. 1 and 2, the flap-shaped cutoff part has an upper face surface and a lower face surface spaced closely apart with a circumferential edge extending around the part and between the two face surfaces. The circumferential edge is grooved and a sealing ring 5 is seated within the groove around the full circumference of the part. The wall thickness S, note FIG. 1, of the cutoff part 4 is very thin relative to the inside diameter of the housing 1. As viewed in FIG. 1, with the cutoff part 4 in the fully opened position, the wall thickness S of the part takes up very little of the flow cross-section through the flow passageway 2 in the housing 1.

As seen in FIGS. 2 and 3, the upper part of the flow passageway adjacent the flange side 3 forms a valve seat for cutoff part. For the purposes of this description, the face surface of the cutoff part 4 facing toward the valve seat is characterized as the first face surface and the other face surface is characterized as the second face surface.

A generally L-shaped support shaft 6 is welded on the second face surface 7 of the cutoff part 4 and projects first outwardly from the second face surface generally in the axial direction of the flow passageway 2 and then is bent and extends laterally outwardly beyond the circumferential edge of the cutoff part and has a ball member formed at its end spaced from the cutoff part. The support shaft 6 extends in a diametrical plane of the cutoff part and the section of the shaft extending outwardly from the cutoff part forms an oblique angle with the face surface of the cutoff part. The ball member 8 is seated within a pivot socket or cup 9 located within the recess 10 in the housing 1 and extending outwardly from the surface of the flow passageway.

On the diametrically opposite side of the cutoff part 4 from the support shaft 6 or the ball member 8, a pin 36 is secured by brackets 37 fixed to the second face surface 7 of the cutoff part. The brackets 37 project outwardly from the second face surface so that the pin 36 is spaced from the second face surface and is general parallel to it. The brackets 37 are located on the opposite side of a shifter rod 13 which extends through the wall of the housing 1 into the flow space 2. A slot-like sliding guide 35 extends through the shifter rod 13 at its end extending into the flow passageway. The pin 36 extends through the sliding guide between its points of support in the brackets 37. The shifter rod 13 is an axially extending member and the prolongation of its axis extends through the axis of rotation 29 of the cutoff part 4, in other words, the prolongation of the axis of the shifter rod 13 forms the axis of rotation 29 for the cutoff part 4. If the shutoff valve is in the open position, as shown in FIG. 1, the inner end of the shifter rod 13 containing the pin 36 is located adjacent the inside wall of the housing 1. As can be seen in FIG. 1, with the cutoff part 4 in the fully open position, it extends generally chordally of the flow passageway and is disposed at an oblique angle relative to the pivot axis 29.

An actuator 16 located exteriorly of the housing 1 effects the opening and closing of the shutoff valve 4. Actuator 16 includes a housing 17 forming a cylinder 18 in which a piston 19 is axially displaceable. A portion of the piston 19 is formed as an axially extending sleeve spaced inwardly from the housing 17. The end of the shifter rod 13 spaced outwardly from the valve housing 1 extends into the actuator 16 and through the sleeve-like part of the piston 19. Though not shown, the sleeve has a pin extending radially of the axial direction of the shifter rod 13 and protruding into a cutout in the housing 17. The cutout is in the form of an elongated hole with its elongated direction extending parallel to the axis of the shifter rod 13 so that the piston 19 or the shifter rod 13 are prevented from rotating about the axis of the shifter rod. Such a pin can also serve as a position indicator and/or for actuating limit switches.

A guidance sleeve 27 laterally encloses the shifter rod 13 and is fixed into the end of the housing 17 of the actuator 16 adjacent the valve housing 1. A metal bellows 20 is located within the housing 17 and is fixed at one end to the guidance sleeve 27 and at its other end to the surface of the piston 19 facing toward the valve housing 1. A control valve 28 is connected to the actuator 16 for operating the piston-cylinder unit 18–19. The shifter rod 13 is, in effect, a piston rod and is displaced only axially by the piston for pivoting the cutoff part 4. The shifter rod 13 is guided in the actuator 16 so that it only moves axially when the piston is displaced within the cylinder and it cannot rotate about its axis. The arrangement for preventing rotation of the shifter rod 13 has been mentioned above, however, it is not shown in the drawing. The displacement of the cutoff part 4 between the opened and closed positions is effected through the axial displacement of the shifter rod 13. At its end extending into the valve housing 1, the shifter rod forms the sliding guide 35. As can be seen in the sectional views of FIGS. 6, 7 and 8 the slot-like sliding guide extends completely through the shifter rod in a chordal manner. The sliding guide as can be seen in FIGS. 4 and 5 extends in a helical-like manner. Pin 36 extends through the slot-like sliding guide 35 with its ends fixed in the brackets 37. The brackets are rigidly secured to the second face surface of the cutoff part 4.

The sliding guide 35 is displayed on a larger scale in FIGS. 4 to 8 and in the axial direction of the shifter rod 13 it has a length made up in part of sections a, b where the sliding guide extends in a helical fashion. The sliding guide is located adjacent the end face 38 of the shifter rod 13, that is, the end face which is located within the valve housing 1. The axially extending section a of the sliding guide is helically arranged so that it rotates the pin 36 for an angle of 90°. The section b of the sliding guide is disposed obliquely with regard to the axis 29 of the shifter rod 13 and is slightly curved in an arc-shaped manner. A flat wedge surface could also be used.

With shutoff valve in the open position, as shown in FIG. 1, the pin 36 is located at the end of the sliding guide closer to the end face 38 of the shifter rod 13 located the valve housing 1. If the shifter rod 13 is moved axially into the housing by supplying actuating fluid into the housing 17 through the line 30 for pressurizing the piston 19 and moving the piston toward the valve housing 1. As the shifter rod 13 is moved axially into the valve housing 1, the pin moves relative to the sliding guide 35 causing the cutoff part 4 to rotate through 90° until it reaches the position displayed in FIG. 2. In FIG. 4 the pin 36 has moved through the sliding guide 35 for the axial length a effecting the required pivotal action of the flap-shaped cutoff part through 90° about the pivot axis 29. If the axial movement of the shifter rod 13 is continued into the housing 1, the pin moves from the end of the section a of the sliding guide through the section b causing the cutoff part 4 to be pressed against the valve seat formed by the housing, note FIG. 3. In the arrangement shown in FIG. 3, the sealing ring 5 extending around the circumferential edge of the cutoff part 4 is pressed against the inwardly tapering surface of the housing forming the flow passageway. When the valve is in the closed position as shown in FIG. 3 and is to be opened, the opening process is effected by a reverse sequence of the operations described above in the closing process. In the opening operation, the side of the piston within the cylinder 18, that is, the side facing the housing 1 is pressurized with a fluid medium flowing through the line 31 while the opposite side of the piston presses the fluid out through the line 30.

In the embodiment shown in FIGS. 1-3, the sliding guide 35 is formed by the slot extending through the shifter rod at the end of the rod located within the valve housing 1 with the piston 19 being secured to the cutoff part 4. It is possible to reverse this arrangement of the sliding guide 35 and the pin 36 so that the pin is moved by the shifter shifter rod 13 while the sliding guide 35 remains stationary. In the embodiment illustrated, the sliding guide completely penetrates through the shifter rod 13 with the pin extending completely through the slot-like sliding guide, it would also be possible to provide an arrangement where the sliding guide is in the form of a groove in the shifter rod so that the pin extends only into the groove and does not extend through the shifter rod. In such an arrangement, the pin would be secured to only one side of the shifter rod. For reasons of symmetry, such grooves serving as sliding guides would be provided on diametrically opposite sides of the shifter rod 13. While in the embodiment illustrated, the cutoff part 4 has a grooved circumferentially extending edge in which the sealing ring 5 is secured, it would also be possible that a circumferentially continuous sealing ring is placed in a corresponding groove in the inner surface of the housing 1 without any impairment of the function of the device. Moreover, as shown in FIGS. 1-3, the ball member 8 and the shifter rod 13 are located in the same diametrical plane through the cutoff part 4. In principle, it is also possible to position these parts with reference to the cutoff part in such a way that they are located in a plane parallel to and offset from the diametrical plane. As a rule, such an arrangement would be considered only for special design cases, since the pivot axis of the cutoff part would be offset sidesays with the complete opening of the shutoff part within the housing being impaired.

Further, the brackets 37 holding the pin 36 are located on the second face surface close to the circumferential edge of the cutoff part 4. It would be possible to locate these brackets inwardly of the location shown if because of certain considerations it is intended to apply the pressure force to the cutoff part as centrally arranged as possible.

In the embodiment illustrated in FIGS. 1-3, the cutoff part 4 is displaced into its closed position when the shifter rod is pushed into the valve housing 1. It would also be possible to provide an arrangement where the shifter rod is displaced into the valve housing 1 when the shutoff valve is in the open position so that the sliding guide 35 would have a shape opposite to the one depicted in FIGS. 4 and 5. To press the cutoff part 4 into sealing engagement with the valve seat formed on the inside surface of the housing adjacent the flange 3, the shifter rod 13 would be pulled out of the housing 1. The cutoff part 4 would be pressed against the valve seat in such a reversed movement. Such an arrangement, however, does not appear desirable, since the shifter rod 13 would extend a considerably greater distance into the housing 1 of the open shutoff valve and thus cause a reduction in the free cross-sectional space of the flow passageway 2.

While specific embodiments of the invention have been shown and described in detail to illustrate the application of the inventive principles, it will be understood that the invention may be embodied otherwise without departing from such principles.

I claim:

1. Shutoff valve for a pipeline or a container comprising a housing forming an axially extending flow passageway with a valve seat formed by said housing and encircling the axis of the flow passageway, a flap shaped cutoff part pivotally mounted in the flow passageway, an actuator located exteriorly of said housing and extending therethrough and connected to said cutoff part so that said cutoff part can be pivoted from a first position in sealed contact with said valve seat blocking flow through the flow passageway and at least one other position permitting flow through the flow passageway, said cut off part having a pair of oppositely directed face surfaces extending transversely of the axis of the flow passageway in the first position of said cutoff part, a circumferential edge bordering said cutoff part and extending between said face surfaces, and a pivot axis spaced from the face surfaces on said cutoff part, said pair of face surfaces comprising a first face surface facing said valve seat in the first position of said cutoff part and an oppositely directed second face surface, a pivot shaft having a first end and a second end, said pivot shaft secured at the first end to the second face surface of said cutoff part and extending outwardly from the circumferential edge thereof, a ball member located at the second end of said pivot shaft, means in said housing for mounting said ball member in a universally pivotal and tiltable manner to initially disengage the cutoff part from the first position, means on said cutoff part diametrically opposite said pivot shaft for connecting said actuator to said cutoff part, said actuator comprises an axially extending shifter rod displaceable in the axial direction thereof and having a first end secured to said means for connecting said actuator and a second end spaced outwardly from said flow passageway in said housing, said means for connecting said actuator to said cutoff part comprises a sliding guide located in one of said cutoff part and said shifter rod and a guide pin secured in the other one of said shifter rod and cutoff part and extending into said sliding guide, said sliding guide extending generally in the axial direction of said shifter rod and said guide pin extending transversely of the axial direction of said shifter rod, said sliding guide disposed obliquely with respect to the axial direction of said shifter rod so that the axial displacement of said shifter rod and the engagement of said guide pin in said sliding guide effects the pivotal and tiltable movement of said cutoff part between the first position and said at least one other position thereof, said shifter rod is displaceable only in the axial direction, and said sliding guide has a generally axially extending section extending helically relative to the axis of said shifter rod for effecting a rotational movement of said guide pin for pivotally and tiltable displacing said cutoff part between the first position and the at least one other position.

2. Shutoff Valve, as set forth in claim 1, wherein said sliding guide is located adjacent the first end of said shifter rod and said guide pin is secured to said cutoff part, said sliding guide is a slot-like guide extending completely through said shifter rod, and said guide pin extends through said sliding guide with the opposite ends of said pin located outwardly on the opposite sides of said shifter rod, and stationary brackets secured to the second face surface of said cutoff part with said guide pin being mounted in said brackets and spaced outwardly from said second face surface.

3. Shutoff valve, as set forth in claim 2, wherein said sliding guide extends generally in the axial direction of said shifter rod and has a first axially extending section closer to the first end of said shifter rod for effecting a rotational movement of said guide pin through 90°, and a second section extending from said section away from the first end of said shifter rod with the second section curved slightly relative to the axial direction of the shifter rod for effecting a pressing movement on said cutoff part for displacing it into the first position thereof.

4. Shutoff valve, as set forth in claim 1, wherein said cutoff part has a pivot axis formed by a prolongation of the axis of said shifter rod with the prolongation extending centrally through said ball member on the second end of said support shaft, said cutoff part being spaced laterally from said pivot axis with said pivot axis being located closer to the second face surface of said cutoff part.

5. Shutoff valve, as set forth in claim 4, wherein said support shaft is L-shaped having a first leg extending outwardly from the second face surface of said cutoff part and a second leg extending between the end of said first leg spaced outwardly from said second face surface into said means in said housing for mounting said ball member, and said means in said housing for mounting said ball member comprises a recess formed in said housing outwardly from the flow passage therein and a pivot cup mounted within said recess and securing said ball member in a universally pivotal manner.

6. Shutoff valve, as set forth in claim 1, wherein said actuator comprises an actuator housing, a piston cylinder unit located within said actuator housing, the second end of said shifter rod connected to said piston cylinder unit, said actuator housing including a guide sleeve for said shifter rod, and a metal bellows laterally enclosing said shifter rod within said actuator and extending between said guide sleeve and said piston cylinder unit.

* * * * *